United States Patent
Wuest et al.

(10) Patent No.: US 11,123,931 B2
(45) Date of Patent: Sep. 21, 2021

(54) METHODS AND DEVICES FOR PRODUCING THREE-DIMENSIONAL OBJECTS BY SELECTIVELY SOLIDIFYING A CONSTRUCTION MATERIAL APPLIED IN LAYERS

(71) Applicant: TRUMPF Laser—und Systemtechnik GmbH, Ditzingen (DE)

(72) Inventors: Frank Peter Wuest, Herrenberg (DE); Julian Gruber, Korntal (DE); Michael Thielmann, Vaihingen an der Enz (DE); Damien Buchbinder, Gerlingen (DE); Joachim Wagner, Stuttgart (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 373 days.

(21) Appl. No.: 16/207,712

(22) Filed: Dec. 3, 2018

(65) Prior Publication Data
US 2019/0099956 A1 Apr. 4, 2019

Related U.S. Application Data

(63) Continuation of application No. PCT/EP2017/062927, filed on May 29, 2017.

(30) Foreign Application Priority Data

Jun. 8, 2016 (DE) .......................... 102016110593.7

(51) Int. Cl.
*B29C 64/393* (2017.01)
*B33Y 30/00* (2015.01)
(Continued)

(52) U.S. Cl.
CPC ............ *B29C 64/393* (2017.08); *B22F 10/20* (2021.01); *B29C 64/153* (2017.08);
(Continued)

(58) Field of Classification Search
CPC ... B29C 64/393; B29C 64/268; B29C 64/153; B22F 10/20; B22F 10/30; B22F 10/10;
(Continued)

(56) References Cited

U.S. PATENT DOCUMENTS 6,861,613 B1 * 3/2005 Meiners ................. B33Y 10/00
                                                   219/121.65
7,045,738 B1   5/2006 Kovacevic et al.
(Continued)

FOREIGN PATENT DOCUMENTS

CN      1631582 A    6/2005
CN    103978307 A    8/2014
(Continued)

OTHER PUBLICATIONS

International Preliminary Report on Patentability in International Application No. PCT/EP2017/062927 dated Dec. 20, 2018, 6 pages (English translation).
(Continued)

*Primary Examiner* — Michael J Brown
(74) *Attorney, Agent, or Firm* — Fish & Richardson P.C.

(57) ABSTRACT

The disclosure relates to a methods and devices for producing three-dimensional objects by a beam acting on and selectively solidifying a construction material applied layer by layer. The devices include at least one process chamber, which has a building platform on which the three-dimensional object is created, a radiation source for producing the beam, at least one beam guiding element, and a process assisting device movable above the building platform and having a first and second module with a beam guiding portion arranged between for the beam that is directed onto the building platform. Each module has at least one application device for discharging construction material and a monitoring device with at least one sensor element for sensing the applied and solidified layer of construction material.

19 Claims, 2 Drawing Sheets

(51) Int. Cl.
*B33Y 50/02* (2015.01)
*B29C 64/153* (2017.01)
*B33Y 10/00* (2015.01)
*B22F 10/20* (2021.01)
*B29C 64/268* (2017.01)
*B22F 10/30* (2021.01)
*B22F 10/10* (2021.01)

(52) U.S. Cl.
CPC ............ *B29C 64/268* (2017.08); *B33Y 10/00* (2014.12); *B33Y 30/00* (2014.12); *B33Y 50/02* (2014.12); *B22F 10/30* (2021.01); *Y02P 10/25* (2015.11)

(58) Field of Classification Search
CPC ......... B22F 10/00; B33Y 10/00; B33Y 30/00; B33Y 50/02; Y02P 10/25
USPC ........................................................ 700/117
See application file for complete search history.

(56) References Cited

U.S. PATENT DOCUMENTS

| | | | |
|---|---|---|---|
| 7,713,454 B2 * | 5/2010 | Larsson | B29C 64/153 |
| | | | 264/40.6 |
| 10,518,354 B2 | 12/2019 | Lin et al. | |
| 2009/0206065 A1 * | 8/2009 | Kruth | B23K 26/0665 |
| | | | 219/121.66 |
| 2014/0271328 A1 * | 9/2014 | Burris | B23K 26/083 |
| | | | 419/53 |
| 2015/0273583 A1 | 10/2015 | Bumgardner | |
| 2016/0332381 A1 * | 11/2016 | Long | B33Y 50/02 |

FOREIGN PATENT DOCUMENTS

| | | |
|---|---|---|
| CN | 104001915 A | 8/2014 |
| DE | 102013109162 | 2/2015 |
| DE | 102013021891 | 6/2015 |
| EP | 0856393 | 8/1998 |
| EP | 1396556 | 3/2004 |
| WO | WO 2014/199149 | 12/2014 |
| WO | WO 2015/003804 | 1/2015 |
| WO | WO 2017/199149 | 11/2017 |
| WO | WO 2018/076205 | 5/2018 |

OTHER PUBLICATIONS

International Search Report and Written Opinion in International Application No. PCT/EP2017/062927, dated Sep. 15, 2017, 13 pages (with English translation).
CN Search Report in Chinese Appln. No. 201780035601.8, dated Apr. 28, 2020, 2 pages (English translation).

* cited by examiner

METHODS AND DEVICES FOR PRODUCING THREE-DIMENSIONAL OBJECTS BY SELECTIVELY SOLIDIFYING A CONSTRUCTION MATERIAL APPLIED IN LAYERS

CROSS REFERENCE TO RELATED APPLICATIONS

This application is a continuation of and claims priority under 35 U.S.C. § 120 from PCT Application No. PCT/EP2017/062927 filed on May 29, 2017, which claims priority from German Application No. 10 2016 110 593.7 filed on Jun. 8, 2016. The entire contents of each of these priority applications are incorporated herein by reference.

TECHNICAL FIELD

The invention relates to methods and devices for producing three-dimensional objects by selectively solidifying a construction material applied in layers, in which a beam acting on the applied construction material generates a solidified layer on a construction platform.

BACKGROUND

DE 10 2013 021 891 A1 describes a device having an accelerated process for a 3D printing method, the device including several printing heads which are displaced in an XY-plane for selectively solidifying a construction material applied in layers to generate a three-dimensional object. To increase the volume performance, a parallelization of the procedures of coating and printing is provided. These procedures are carried out simultaneously by several coating and printing units arranged one behind the other, such that, in a common transition of the coating and printing units, several layers are deposited and selectively solidified.

US 2015/0273583 A1 describes a laser scanning inspection device that has several contactless sensors arranged one next to the other, which can be displaced together along a guiding arrangement along a construction chamber for a workpiece to be constructed in layers. Furthermore, this device includes a scraper and a position sensor. This laser scanning inspection device is displaced with the scraper to level out and to detect the surfaces to be applied. Then, the laser beam is deflected by a mirror onto the layer to be solidified. After the construction of the solidified layer by a laser, the laser scanning inspection device is displaced again.

DE 10 2013 109 162 A1 discloses a method and a device for producing three-dimensional objects by selectively solidifying a construction material applied in layers. Here, a heating module is provided above a construction platform, which extends in an XY-plane, the heating module including several functional openings. A radiation source is provided above the heating module, by which radiation source a laser beam is directed towards the construction platform. A heating module is provided next to the radiation source and an application device for the construction material next to that. In addition, an infrared radiator is adjacently provided in turn, to heat up the construction material or the generated layer. To apply a layer, the construction platform or the last layer applied is heated by an infrared beam. Then, during a displacement movement of the construction platform relative to the heating module, a construction material is applied. Subsequently, this applied construction material is solidified by the laser beam. A second layer is generated by an opposing displacement movement of the construction platform, and a sequence that is analogous to the sequence of solidifying the first layer is carried out.

WO2018/076205 A1 describes a method for producing three-dimensional objects, wherein several layers can be constructed on an endless tape for producing three-dimensional objects. Several individual coating devices or corresponding beam sources are provided along the endless tape for applying a laser beam, such that coating and exposing take place in parallel or the construction material is solidified.

WO2017/199149 A1 describes a device for producing three-dimensional objects by solidifying a construction material applied in layers in a process chamber on a construction platform. Here, in each case, a laser beam is applied to a work region of the construction platform via several optical elements. In each case, a flow channel is positioned in front of and behind the laser beam to generate a protective gas flow. This is provided in opposition to the displacement direction of the laser beam. On this protective gas flow device, in front of it and behind it, in each case yet another slide for smoothing the construction material is provided. A store for releasing construction material to be newly applied is arranged adjacently and outside the construction platform

SUMMARY

This disclosure describes devices for producing three-dimensional objects by selectively solidifying a construction material applied in layers, and methods for producing such three-dimensional objects to reduce the processing time, e.g., auxiliary process time, and to increase productivity while simultaneously monitoring the quality of the layer to be applied.

In some implementations, a device for producing three-dimensional objects by selectively solidifying a construction material applied in layers, the device having a process support device having a first and second module with a beam guiding section lying therebetween for the beam directed towards the construction platform, and the first and second module each have an application device for releasing construction material and a monitoring device having at least one sensor for detecting the applied and solidified layer. The first and second modules are thus constructed redundantly. As a result, it is possible that the first module is displaced in front of the beam with a displacement movement in a first displacement direction, and the second module is displaced behind the beam, and, in an opposing displacement direction of the beam, the second module is guided in front and the first module is guided behind. This makes it possible for the layer of the applied and not yet solidified construction material and the layer of the solidified construction material to be directly detected by the monitoring device having at least one sensor element during the solidification process by the beam, whereby the quality can be monitored and the auxiliary process time can be reduced or set to zero.

The first module and the second module and, in between, the beam guiding section, are arranged to be lined up one after the other along a common axis. The at least one application device and monitoring device provided in each respective module are arranged mirror-symmetrically in relation to the beam guiding section. As a result, a two-sided method of the process support device is possible, and the same functionality is given in each displacement direction.

The monitoring device is provided directly adjacent to the beam guiding section and the application device is provided removed from the beam guiding section in each respective module. This arrangement has the advantage that the process parameters can be detected directly adjacently to the meeting point of the beam on the construction material. The at least one sensor element in front can detect the completeness and/or the required thickness of the layer applied of the construction material, and the at least one sensor element in the monitoring position behind can analogously detect for the solidified construction material.

The application device of the first and second modules includes a store for the construction material and an application nozzle for the dosed release of the construction material. As a result, a targeted release of the construction material can take place.

The monitoring device of the first and second module has an exposure device adjacent to the at least one sensor element. For example, a thermal camera can be used to detect a cooling rate adjacent to the melting point of the construction material. An infrared radiator, one or a group of diode lasers, or even a white light can be used as the exposure device.

In the first and second module of the process support device, in each case, a flow channel of a protective gas flow device is provided between the application device and the monitoring device, which are respectively aligned towards the beam guiding section and extend transversely relative to the displacement direction of the process support direction. As a result, the melting of the construction material and the solidification to a layer can be improved, since powder deposits, smoke, splatters or similar are promptly removed by supplying a protective gas in the process zones and immediately after that suctioning from the process zones.

The flow channel is formed for suction and as a nozzle, such that the flow direction of the protective gas can be driven depending on the displacement direction of the process support device. As a result, the same process conditions can be recreated independently of the displacement direction of the process support device.

Furthermore, a leveling device is provided on each module between the application device and the monitoring device, the leveling device can be in the form of a brush strip, a rubber lip, or a blade. This arrangement provides the advantage that a smoothing of the construction material for the subsequent solidification of the construction material is provided after the application of construction material from the construction device.

The leveling device and/or the flow channel and/or the application nozzle of the application device, which are aligned transversely to the displacement direction of the process support device, extend across the whole width of the construction platform. As a result, a quasi-closed process space is created around the beam guiding section, whereby, in turn, improved process conditions are created. In addition, the construction material can be applied across the entire width of the application platform.

In some implementations, the disclosure provides methods for producing three-dimensional objects by selectively solidifying a construction material applied in layers, in which a process support device having a first and a second module and a beam guiding section therebetween is displaced at the same time as the deflection of at least one beam onto a construction material in a displacement direction for solidifying the construction material, and each module has an application device for releasing construction material and a monitoring device has at least one sensor element for detecting the applied and solidified layer. During a displacement movement in a first displacement direction of the at least one beam, the first module is guided in front of the at least one beam and the second module behind the at least one beam and, in the opposing displacement direction of the at least one beam, and the second module is guided in front and the first module behind. As a result, with each displacement movement, a layer can be applied, solidified, and monitored, such that at least one parallel coating, solidifying, and monitoring is made possible.

Furthermore, the monitoring device of the respective module is aligned adjacently to the beam guiding section, and the application device of the respective module is aligned to be remote from the beam guiding section, and, in a first displacement direction of the process support device in the leading module, the application device for releasing construction material is driven, and the monitoring device of the first module having at least one sensor element detects the applied layer of the construction material and is monitored and, in the lagging module, the application device is shut down and, in the monitoring device having the at least one sensor element, the process zone in the meeting point of the beam on the layer of the construction material and/or a solidified region of the layer is detected and monitored. As a result, an optimal monitoring of the process parameters during a displacement movement is made possible.

Furthermore, the driving of the first and second module can be interchanged in the event of a direction change in the displacement direction of the beam for solidifying the construction material. As a result of the redundancy of the first and second module, a simple driving is thus given.

The invention and further advantageous embodiments and developments thereof are described and explained in more detail below by the examples depicted in the drawings. The features that can be seen in the description and the drawings can be applied individually or in any combination.

DETAILED DESCRIPTION

Figure 1:
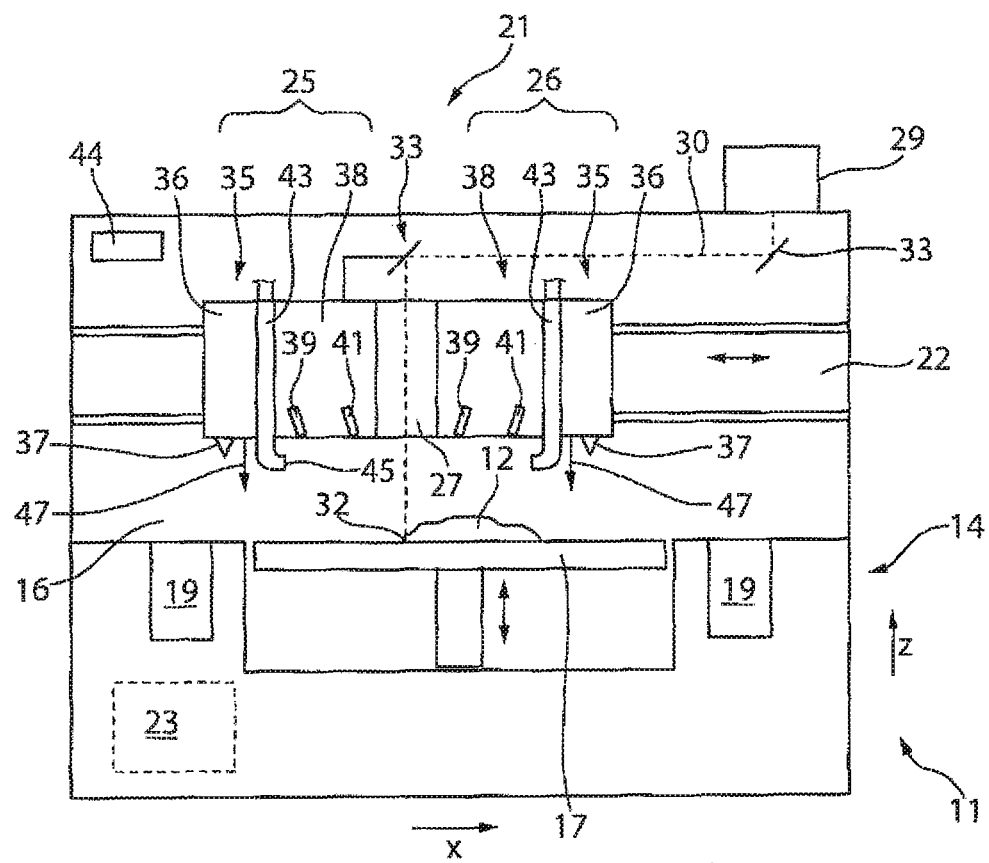
FIG. 1 is a schematic side view of a device.

FIG. 1 depicts a schematic side view of a device 11 for producing three-dimensional objects 12 by selectively solidifying a construction material applied in layers. These devices 11 are also called 3D printing systems, selective laser sintering machines, selective laser melting machines, or similar. The device 11 includes a housing 14 with a process chamber 16, where the process chamber 16 is closed from the outside and is accessible via a door 49 (FIG. 2) or a safety lock. A construction platform 17 is provided in an XY plane in the process chamber 16, on which construction platform 17 a three-dimensional object 12 is generated in layers. Overflow vessels 19 or collection receptacles are arranged adjacent to the construction platform 17, which can be displaced in the Z-direction. The overflow vessels 19 or collection receptacles collect unnecessary or non-solidified construction material. A process support device 21 is arranged above the construction platform 17 in the process chamber 16. This process support device 21 is driven at least in the X-direction along a guide 22 by a controller 23 of the device 11.

The process support device 21 includes a first and second module 25, 26, between which a beam guiding section 27 is arranged. This first module 25, the second module 26, and the beam guiding section 27 can be displaced together as a unit above the construction platform 17.

The beam guiding section 27 can be formed as a free space between the first and second module 25, 26, such that a beam 30 generated by a beam source 29 is guided through the beam guiding section 27 onto the construction platform 17 and deflected to solidify a construction material applied to the construction platform 17 at the meeting point 32. The beam source 29 can be a laser beam source for generating a laser beam. Several beam guiding elements 33 can be provided between the beam source 29 and the meeting point 32 of the beam 30 on the construction material on the construction platform 17. One of the beam guiding elements 33 can be fixedly allocated to the beam guiding section 27.

The first module 25 and the second module 26 are redundantly constructed, such that the construction of the module 25 as described below can be applied analogously for the module 26.

The module 25 includes an application device 35, which has a store 36 for the construction material and an application nozzle 37. Furthermore, the module 25 includes a monitoring device 38, which has at least one sensor element 39. This sensor element 39 can, for example, detect the applied layer thickness and/or the completeness of the construction materials or the solidified layer thickness and the completeness of the solidified layer. Additionally, in the monitoring device, an exposure device 41, which is directed towards the process zone or the melting bath or towards a region adjacent thereto, can detect process parameters thereof. The exposure device 41 can be an infrared-radiator or similar. The at least one sensor element 39 and/or the at least one exposure device 41 are aligned towards the meeting point 32 or adjacently thereto.

A flow channel 43 of a protective gas flow device 44, which is only schematically depicted, is arranged between the application device 35 and the monitoring device 38. This flow channel 43 has a nozzle 45 directed towards the beam guiding section 27. A leveling device 47 is between the flow channel 43 and the application device 35. This can be formed as a brush, a blade or similar. The sequence of the monitoring device 38, the flow channel 43, the leveling device 47 and the application device 35 are mirror images around the beam guiding section 27 for the first and second module 25, 26.

The controller 23 includes at least one data processing device and drives all components of the device 11.

Figure 2:
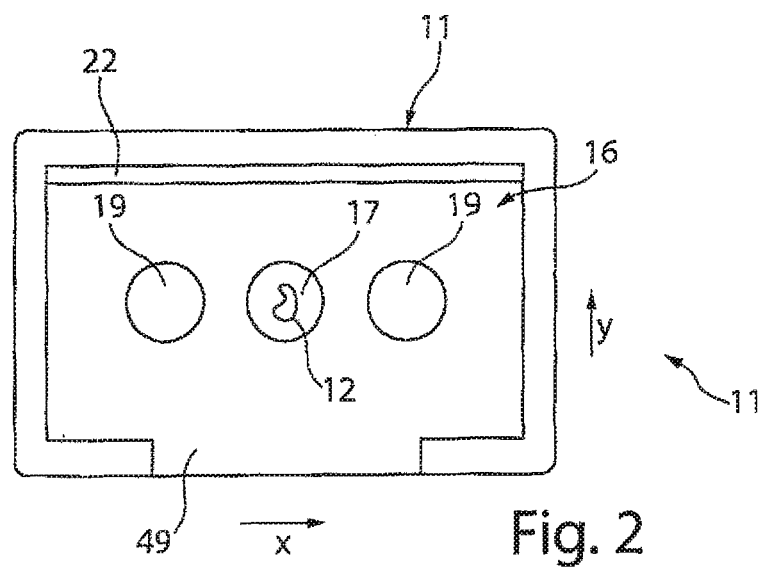
FIG. 2 is a schematic view from above of a construction platform in the process chamber of the device of FIG. 1.

In FIG. 2, a view from above of the construction platform 17 and the overflow vessel 19 is schematically depicted. The geometry of the construction platform can also deviate from a round shape. The door 49 for access into the process chamber 16 is schematically depicted on a front-end face.

Figure 3:
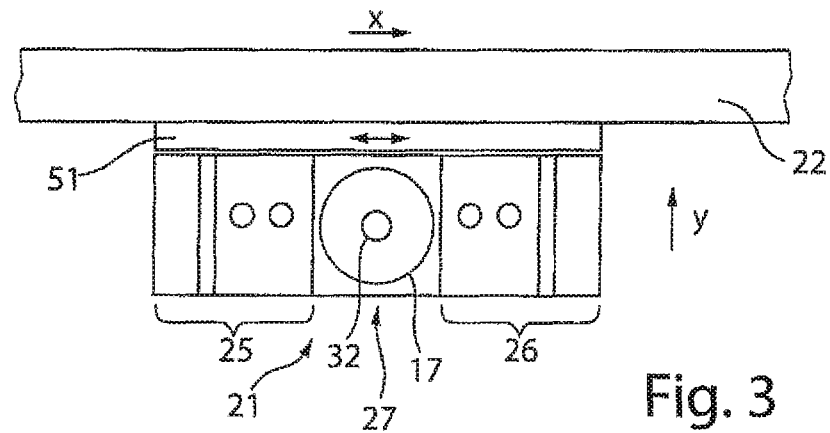
FIG. 3 is a schematic view from above of a process support device of the device of FIG. 1.

FIG. 3 shows a schematic view from above of the process support device 21. The first module 25 and the second module 26, which are positioned in relation to each other along the guide 22, for example across a common base plate 51, are displaceably received on the guide 22. The width of the nozzles 45 of the flow channel 43 corresponds at least to the extent of the construction platform 17 extending in the Y-direction. This advantageously applies analogously to the leveling device 47. The same applies to the application nozzle 37 of the application device 35. As a result, an application of the construction material and a smoothing of the construction material can take place during a first displacement movement in the X-direction and a second displacement movement opposite to the X-direction across the entire width of the construction platform 17. The construction material can alternatively also be deposited selectively and/or regionally, as long as the application nozzle 37 is formed for this.

Furthermore, the extension of the nozzles 45 of the flow channel 43 across the width of the construction platform 17 has the advantage that a protective gas zone can be generated in and around the meeting point 32 of the beam 30 on the construction material. The protective gas zone corresponds at least to the process zone, such that powder deposits, smoke, splatters, and similar can be directly transported away from the melting bath at the meeting point 32.

The construction material to be solidified can be in powder form. A metallic powder and a plastic powder can be used as the construction material.

Figure 4:
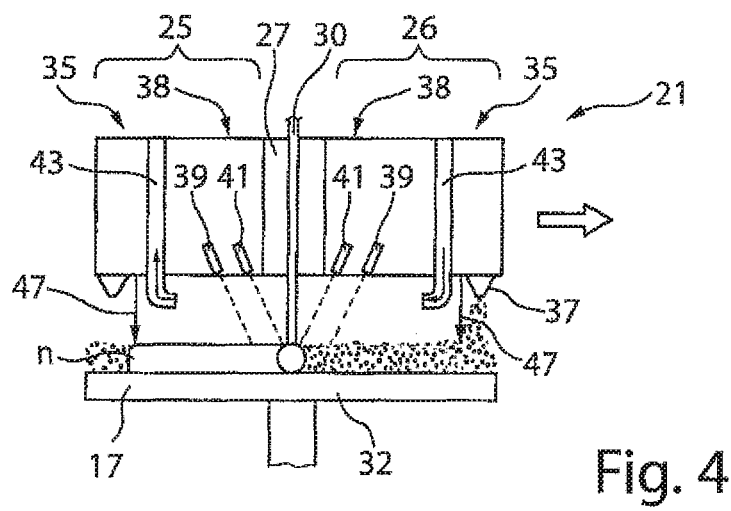
FIG. 4 is a schematic side view of the process chamber during a process step for solidifying a first layer.

FIG. 4 schematically depicts the production of a first layer n for a three-dimensional object 12. The process support device 21 is displaced in a first displacement direction, for example in the X-direction. Here, the second module 26 is in front of and the first module 25 is behind the beam 30. Construction material is applied via the application device 35 of the module 26. Then, the applied construction material is smoothed by the leveling device 47. The at least one sensor element 39 can detect the applied layer in terms of the layer thickness and/or the completeness. Then, the not yet solidified construction material is melted and solidified as a result of meeting the beam 30.

The monitoring of the melting bath can take place by the at least one exposure device 41 in the first and/or second module 25, 26. The at least one sensor element 39 in the first module 25, which is behind the beam 30, can consequently monitor the solidified layer in terms of its thickness and/or completeness. In the case of a blade, the leveling device 47 behind can smooth superelevations on the generated layer n. The application device 35 of the module 25 behind is shut down with this first displacement movement. The protective gas flow device 43 is driven during this first displacement movement and generates a flow of the protective gas, which can be in the opposite direction to the displacement direction of the process support device 21. As a result, the generated heat in the process zone can be transported away via the already solidified layer, such that a thermal influence of the construction material that is still in powder form is reduced or prevented.

Figure 5:
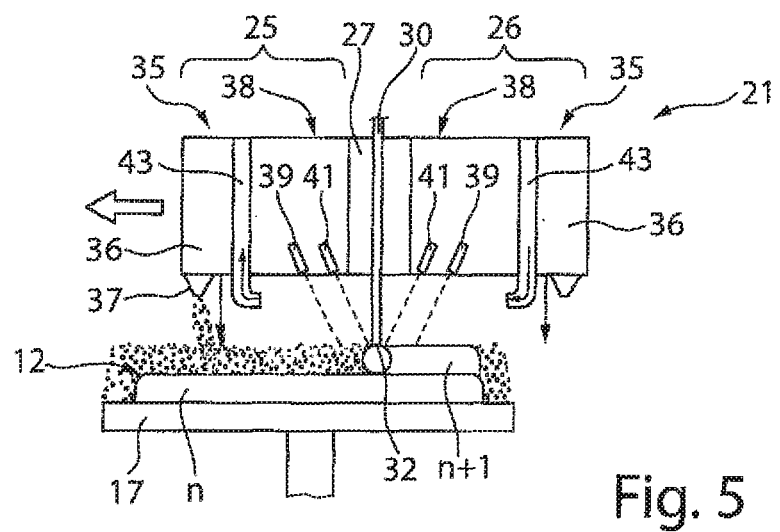
FIG. 5 is a schematic side view of the process chamber in a further process step for solidifying a second layer on the first layer.

After producing the layer n, the displacement direction of the process support device 21 is reversed, such that it is displaced opposite to the X-direction. The driving of the first and second modules 25, 26 is exchanged, such that, consequently, layer n+1 is produced. This is depicted exemplarily in FIG. 5. The function of the second module 26 during the production of layer n is now taken over by the first module 25, which is in front. When applying layer n+1, the second module 26 is behind, corresponding to the module 25, which is behind when applying layer n in FIG. 4.

A complete monitoring of the solidification process of the construction material for each layer n, n+1 is made possible by this process support device 21. At the same time, with the driving of the process support device 21 in each of the two displacement directions, in each case a completely monitored coating process for producing a three-dimensional object 12 can take place.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A device for producing a three-dimensional object, comprising:
   at least one process chamber comprising at least one construction platform arranged in an XY plane, on which construction platform a construction material to be solidified is applied in layers to generate the three-dimensional object;
   a radiation source for generating a beam to selectively solidify the construction material to be solidified;
   at least one beam guiding element for guiding and deflecting the beam onto the construction material to be solidified which is displaceable above the construction platform at least in a direction of the XY plane; and
   a process support device which is displaceable above the construction platform at least in the direction of the XY plane, wherein the process support device comprises
      a beam guiding section for the beam directed onto the construction platform, and
      a first module and a second module arranged on either side of the beam guiding section, wherein each module comprises
         at least one application device for releasing construction material to be solidified and
         a monitoring device having at least one sensor element for detecting the applied and solidified layer of the construction material.

2. The device of claim 1, wherein the first module, the second module, and the beam guiding section are aligned along an axis, and the application device and the monitoring device in each respective module are arranged mirror-symmetrically to the beam guiding section.

3. The device of claim 1, wherein the monitoring device is arranged directly adjacent to the beam guiding section and the application device is arranged remote from the beam guiding section on each respective module.

4. The device of claim 1, wherein the at least one application device has a store for the construction material and an application nozzle for the dosed or selective release or both of the construction material to be solidified.

5. The device of claim 1, wherein the monitoring device has at least one exposure device adjacent to the at least one sensor element.

6. The device of claim 1, wherein the first and second modules each comprise a flow channel of a protection gas flow device arranged between the respective application device and the monitoring device, wherein each protection gas flow device comprises a flow nozzle aimed at the beam guiding section.

7. The device of claim 6, wherein the flow channels are formed for suctioning and outflowing protective gas, such that the flow direction of the protective gas can be changed depending on the movement direction of the process support device.

8. The device of claim 1, wherein each module has a leveling device arranged between the at least one application device and the monitoring device.

9. The device of claim 8, wherein each module has a leveling device arranged between the at least one application device and the flow channel.

10. The device of claim 8, wherein the leveling device comprises a brush element, a rubber lip, or a blade.

11. The device of claim 8, wherein any one or more of the flow channels, the leveling devices, and the application nozzles of the application device are arranged at a right angle to the displacement direction.

12. The device of claim 8, wherein any one or more of the flow channels, the leveling devices, and the application nozzles of the application device extend across the entire width of the construction platform.

13. The device of claim 1, wherein the radiation source comprises a laser radiation source for generating a laser beam.

14. A method for producing three-dimensional objects by selectively solidifying construction material applied in layers, the method comprising:
   applying the construction material on a construction platform to form a layer;
   generating at least one beam by a radiation source and directing the at least one beam towards the applied layer of construction material with at least one beam guiding element;
   solidifying the construction material by the at least one beam directed towards the applied layer of the construction material; and
   simultaneously moving a process support device having a beam guiding section and a first and second module on either side of the beam guiding section along a movement direction of the at least one beam directed to the construction material,
   wherein each module comprises an application device for releasing construction material and a monitoring device having at least one sensor element for detecting the layer that has been applied and solidified.

15. The method of claim 14, further comprising
   displacing the process support device in a first displacement direction with a leading application device releasing the construction material, wherein the monitoring device of the first and second module is aligned adjacently to the beam guiding section, and the application device is aligned to be remote from the beam guiding section;
   detecting and monitoring the applied layer of the construction material by the at least one sensor element of the monitoring device, with the application device switched off in a lagging module; and
   detecting one or both of a melting bath at the meeting point of the beam on the layer or a solidified region of the layer of the construction material adjacent to the melting bath in the monitoring device by the at least one sensor element.

16. The method of claim 14, wherein in the event of a change of direction in the displacement direction of the process support device, a controller switches the direction of movement of the first and second module.

17. The method of claim 14, further comprising driving a flow direction of a protective gas of a protective gas flow device between flow channels of the first and second module in a direction opposite to the displacement direction of the process support device.

18. The method of claim 14, wherein a laser radiation source is used as the radiation source, and the construction material applied in layers is selectively solidified by a laser beam.

19. The method of claim 14, wherein the construction material applied in layers is selectively solidified by laser sintering or laser melting.

* * * * *